US008538557B2

(12) United States Patent
Hunt et al.

(10) Patent No.: US 8,538,557 B2
(45) Date of Patent: Sep. 17, 2013

(54) GOBO VIRTUAL MACHINE

(75) Inventors: Mark A Hunt, Derby (GB); Drew Findley, Sherman Oaks, CA (US)

(73) Assignee: Production Resource Group, LLC, New Windsor, NY (US)

( * ) Notice: Subject to any disclaimer, the term of this patent is extended or adjusted under 35 U.S.C. 154(b) by 0 days.

(21) Appl. No.: 13/286,415

(22) Filed: Nov. 1, 2011

(65) Prior Publication Data

US 2012/0046766 A1 Feb. 23, 2012

Related U.S. Application Data

(63) Continuation of application No. 12/276,035, filed on Nov. 21, 2008, now Pat. No. 8,050,777, which is a continuation of application No. 10/913,023, filed on Aug. 6, 2004, now Pat. No. 7,457,670.

(60) Provisional application No. 60/493,531, filed on Aug. 7, 2003.

(51) Int. Cl.

*G05B 15/00* (2006.01)
*G09G 5/00* (2006.01)
*G03H 1/00* (2006.01)
*G03H 1/02* (2006.01)

(52) U.S. Cl.

USPC .......................... 700/1; 345/1.3; 359/1; 359/3

(58) Field of Classification Search

USPC .............. 700/1; 345/1.3, 312; 359/219, 298, 359/1, 3, 19

See application file for complete search history.

(56) References Cited

U.S. PATENT DOCUMENTS

| | | | | |
|---|---|---|---|---|
| 3,312,142 | A | 4/1967 | Nikolaevich | |
| 3,596,379 | A | 8/1971 | Faulkner | |
| 4,468,688 | A | 8/1984 | Gabriel et al. | |
| 4,528,642 | A * | 7/1985 | Waller | 345/619 |
| 4,599,645 | A | 7/1986 | Brown et al. | |
| 4,681,415 | A | 7/1987 | Beer et al. | |
| 4,776,796 | A | 10/1988 | Nossal | |
| 4,947,302 | A * | 8/1990 | Callahan | 362/233 |
| 4,972,305 | A | 11/1990 | Blackburn | |
| 5,128,658 | A * | 7/1992 | Pappas et al. | 345/600 |

(Continued)

OTHER PUBLICATIONS

Murtagh-T., "Digital Television Techniques and Interactive Video Applications in the Planetarium," Mar. 1989, Irish Astronomical Journal, vol. 19, No. 1, pp. 17-21.

(Continued)

*Primary Examiner* — Kavita Padmanabhan
*Assistant Examiner* — Thomas Stevens
(74) *Attorney, Agent, or Firm* — Law Office of Scott C. Harris, Inc.

(57) ABSTRACT

Producing complicated effects based on image processing operations. The image processing operations are defined for a processor which may be different than the processor which is actually used. The processor that is actually used runs an interpreter that interprets the information into its own language, and then runs the image processing. The actual information is formed according to a plurality of layers which are combined in some way so that each layer can effect the layers below it. Layers may add to, subtract from, or form transparency to the layer below it or make color filtering the layer below it. This enables many different effects computed and precompiled for a hypothetical processor, and a different processor can be used to combine and render those effects.

24 Claims, 4 Drawing Sheets

(56) References Cited

U.S. PATENT DOCUMENTS

| | | | | |
|---|---|---|---|---|
| 5,150,312 | A * | 9/1992 | Beitel et al. | 345/418 |
| 5,307,295 | A * | 4/1994 | Taylor et al. | 703/1 |
| 5,329,431 | A * | 7/1994 | Taylor et al. | 362/85 |
| 5,343,294 | A | 8/1994 | Kuchel et al. | |
| 5,345,262 | A * | 9/1994 | Yee et al. | 348/177 |
| 5,414,328 | A | 5/1995 | Hunt et al. | |
| 5,812,596 | A | 9/1998 | Hunt et al. | |
| 5,969,485 | A | 10/1999 | Hunt | |
| 5,978,523 | A * | 11/1999 | Linford et al. | 382/305 |
| 5,983,280 | A | 11/1999 | Hunt | |
| 6,029,122 | A | 2/2000 | Hunt | |
| 6,064,771 | A * | 5/2000 | Migdal et al. | 382/232 |
| 6,175,771 | B1 | 1/2001 | Hunt et al. | |
| 6,211,627 | B1 | 4/2001 | Callahan | |
| 6,256,136 | B1 | 7/2001 | Hunt | |
| 6,259,810 | B1 * | 7/2001 | Gill et al. | 382/166 |
| 6,431,711 | B1 | 8/2002 | Pinhanez | |
| 6,466,357 | B2 | 10/2002 | Hunt | |
| 6,503,195 | B1 * | 1/2003 | Keller et al. | 600/160 |
| 6,530,662 | B1 | 3/2003 | Haseltine et al. | |
| 6,536,904 | B2 | 3/2003 | Kunzman | |
| 6,549,326 | B2 | 4/2003 | Hunt et al. | |
| 6,565,941 | B1 | 5/2003 | Hewlett | |
| 6,751,239 | B2 | 6/2004 | Raman et al. | 370/466 |
| 6,831,617 | B1 | 12/2004 | Miyauchi et al. | |
| 6,967,666 | B1 * | 11/2005 | Koda | 345/638 |
| 6,971,764 | B2 * | 12/2005 | Belliveau | 362/233 |
| 7,132,159 | B1 * | 11/2006 | Akhave et al. | 428/343 |
| 7,139,617 | B1 | 11/2006 | Morgan et al. | |
| 7,228,190 | B2 | 6/2007 | Dowling et al. | |
| 7,242,152 | B2 | 7/2007 | Dowling et al. | |
| 7,290,895 | B2 | 11/2007 | Hunt | |
| 7,353,071 | B2 | 4/2008 | Blackwell et al. | |
| 7,358,929 | B2 | 4/2008 | Mueller et al. | |
| 7,390,092 | B2 | 6/2008 | Belliveau | |
| 7,845,823 | B2 * | 12/2010 | Mueller et al. | 362/231 |
| 7,948,490 | B2 * | 5/2011 | Sloan et al. | 345/426 |
| 2002/0005858 | A1 | 1/2002 | Aoki | |
| 2002/0038157 | A1 | 3/2002 | Dowling et al. | |
| 2002/0141732 | A1 | 10/2002 | Reese | |
| 2002/0171672 | A1 * | 11/2002 | Lavelle et al. | 345/630 |
| 2002/0180747 | A1 * | 12/2002 | Lavelle et al. | 345/581 |
| 2002/0190989 | A1 * | 12/2002 | Kamata et al. | 345/440 |
| 2003/0057887 | A1 | 3/2003 | Dowling et al. | |
| 2003/0076281 | A1 * | 4/2003 | Morgan et al. | 345/44 |
| 2003/0128210 | A1 | 7/2003 | Muffler et al. | |
| 2003/0214530 | A1 | 11/2003 | Wang et al. | |
| 2004/0109562 | A1 * | 6/2004 | Ohnishi | 380/200 |
| 2004/0135780 | A1 * | 7/2004 | Nims | 345/419 |
| 2004/0156192 | A1 * | 8/2004 | Kerr et al. | 362/154 |
| 2004/0267691 | A1 * | 12/2004 | Vasudeva | 707/1 |
| 2005/0057543 | A1 | 3/2005 | Hunt et al. | |
| 2005/0086589 | A1 | 4/2005 | Hunt | |
| 2005/0094635 | A1 | 5/2005 | Hunt | |
| 2005/0155070 | A1 * | 7/2005 | Slaughter | 725/86 |
| 2005/0190985 | A1 | 9/2005 | Hunt | |
| 2005/0200318 | A1 | 9/2005 | Hunt | |
| 2005/0275626 | A1 | 12/2005 | Mueller et al. | |
| 2006/0158461 | A1 | 7/2006 | Reese et al. | |
| 2006/0187532 | A1 | 8/2006 | Hewlett et al. | |
| 2006/0227297 | A1 | 10/2006 | Hunt | |
| 2008/0140231 | A1 | 6/2008 | Blackwell et al. | |

OTHER PUBLICATIONS

Carr-J., Lighting Up Storage 2004 Network Magazine p. 72-74.

Tobin et al., Accommodating Multiple Illumination Sources in a Imaging Colorimetry Environment 2000 The International Society for Optical Engineering, p. 194-204.

Schumacher et al., 4! (Apple Macintosh G4) Jan. 2003 EMedia Magazine p. 36-40.

* cited by examiner

GOBO VIRTUAL MACHINE

CROSS-REFERENCE TO RELATED APPLICATION

This application is a continuation application of U.S. application Ser. No. 12/276,035 filed Nov. 21, 2008, now U.S. Pat. No. 8,050,777 issued Nov. 1, 2011, which is a continuation of U.S. application Ser. No. 10/913,023 filed Aug. 6, 2004, now U.S. Pat. No. 7,457,670 issued Nov. 25, 2008, which claims the benefit of prior U.S. Provisional Application Ser. No. 60/493,531, filed Aug. 7, 2003 and entitled "Gobo Virtual Machine."

BACKGROUND

Stage lighting effects have become increasingly complex, and are increasingly handled using more and more computing power. During a show, commands for various lights are often produced by a console which controls the overall show. The console has a number of encoders and controls which may be used to control any number of lights.

Complex effects may be controlled by the console. Typically each effect is individual for each light that is controlled.

SUMMARY

The present system teaches an apparatus in which a computer produces an output which is adapted for driving a projector according to commands produced by a console that controls multiple lights. The projector produces the light according to the commands entered on the console.

According to an aspect, certain commands are in a special generic form which enables them to be processed by many different computers.

BRIEF DESCRIPTION OF THE DRAWINGS

These and other aspects will now be described in detail with reference to the accompanying drawings, wherein.

DETAILED DESCRIPTION

Figure 1:
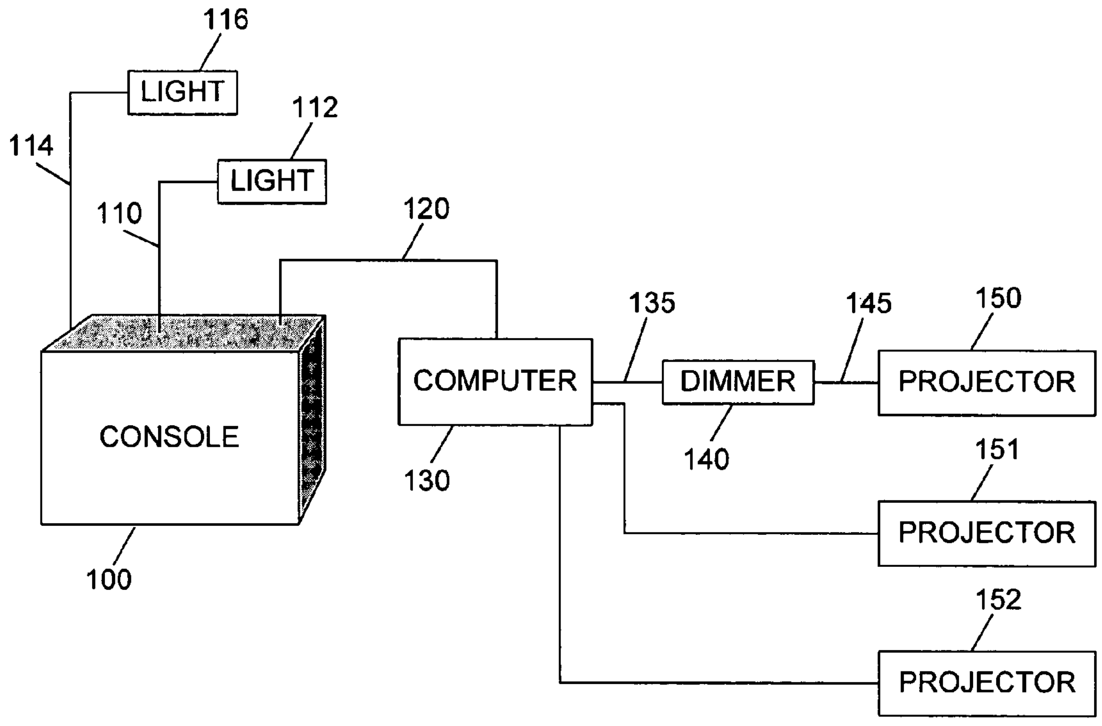
FIG. 1 shows a block diagram of the overall system.

The output of the console 100 may be in various different formats, including DMX 512, or ethernet. The console 100 may be an ICON™ console. This console produces a number of outputs 110, 114 to respectively control a number of lighting units 112, 116. Console is shown producing output 110 to control light 112. Similarly, output 114 may be produced to control light 116.

Another output 120 may be produced to control a digital light shape altering device. Such a light may be the icon M, aspects of which are described, for example, in U.S. Pat. Nos. 6,549,326, 6,617,792, 6,736,528. In this embodiment, however, the output 120 which is intended for the light is actually sent to a computer 130 which runs software to form an image according to commands from the console. The computer 130 produces an output 135 which may be a standard video output. The video output 135 may be further processed according to a dimmer 140. The output of the dimmer is connected to a projector 150. The projector may be, for example, a projector using digital mirror devices or DMD's.

The projector produces output according to its conventional way of producing output. However, this is based on the control 120 which is produced by the console.

Figure 2:
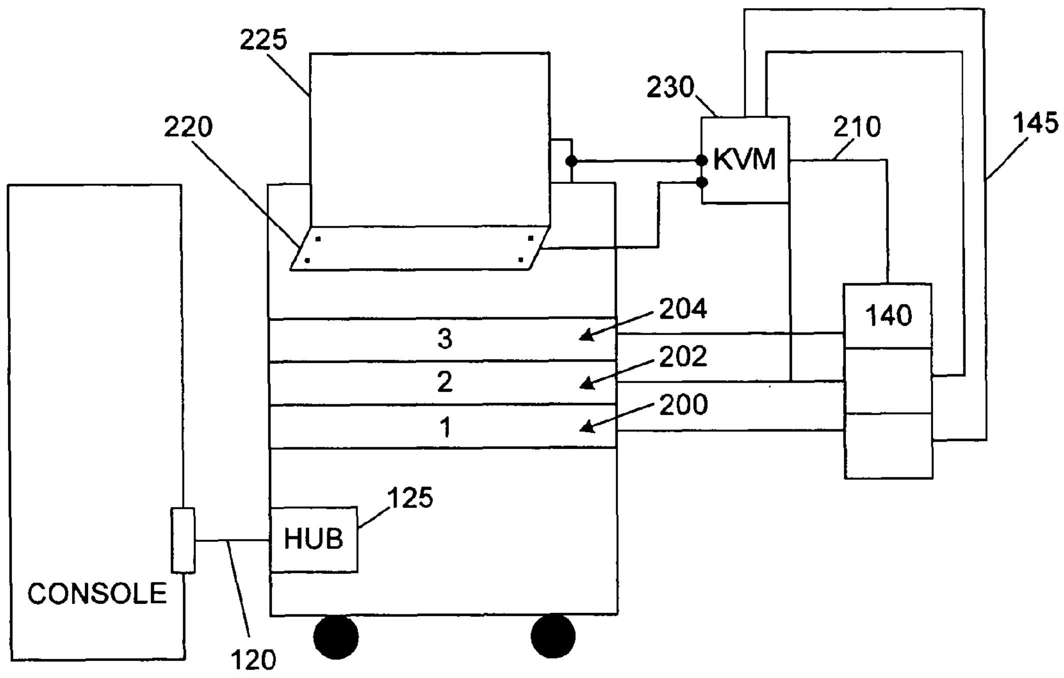
FIG. 2 shows a block diagram of the connection between the console and the box.

In the embodiment, the computer 130 may actually be a bank of multiple computers, which respectively produce multiple outputs for multiple projectors 150, 151, 152. FIG. 2 shows further detail about the connection between the console and the computer. The output of the console may be in any network format. In this embodiment, the output of the console may be in ethernet format, containing information that is directed to three different channels.

The computer 130 is actually a standalone half-height rack, on wheels, with three rack-mounted computers therein. The ethernet output 120 is coupled to an ethernet hub 125 which directs the output to each of the three computers. The three computers are shown as computer 1; designation 200, computer 2; designation 202, and computer 3; designation 204. Each of these computers may be standard computers having keyboard input and display outputs. The outputs of each of the computers are connected to the interface board 140.

Board 140 produces and outputs a first dimmed output 145 adapted for connection to the projector. The second, typically non-dimmed output 210 is connected to a three-way KVM switch. Each of the three computers have outputs which are coupled to the KVM switch. The KVM switch produces a single output representative of the selected computer output.

A single rack-mounted keyboard and monitor are located within the rack and driven by the KVM switch. The keyboard 220 is also connected to the KVM switch 230, and produces its output to the selected computer. For example, when computer 3 is selected, the KVM switch sends the output from keyboard 222 to computer 3 and the output from computer 3 is sent to display 225.

Any type of switch can be used, however standard KVM switches are typically available. Moreover, while this embodiment describes three different computers being used, there is practically no limit on the number of computers that can share input and output with a KVM switch.

The dimmer board may carry out dimming by multiplying each video output by analog values supplied by the associated computer. Moreover, the KVM switch is shown outside of the rack for simplicity, but in reality the KVM switch is rack-mounted within the rack.

As described above, the console produces a signal for each of many lights. That signal represents the desired effect. Different kinds of effects that can be produced may be described herein. The computer which actually does the image processing to form the desired result requested by the console. The computer processes the signal by receiving the command, converting that command into an image which forms a layer, and combining the multiple layers to form an overall image to be displayed by the projector/lamp.

The final image is formed by combining a plurality of layers. Each layer can have a number of different characteristics, but primarily, each layer may be considered to have a shape, a color, and/or an effect. The layers are combined such that each layer covers, adds to, subtracts, or allows transparency, to a layer below it.

Figure 3:
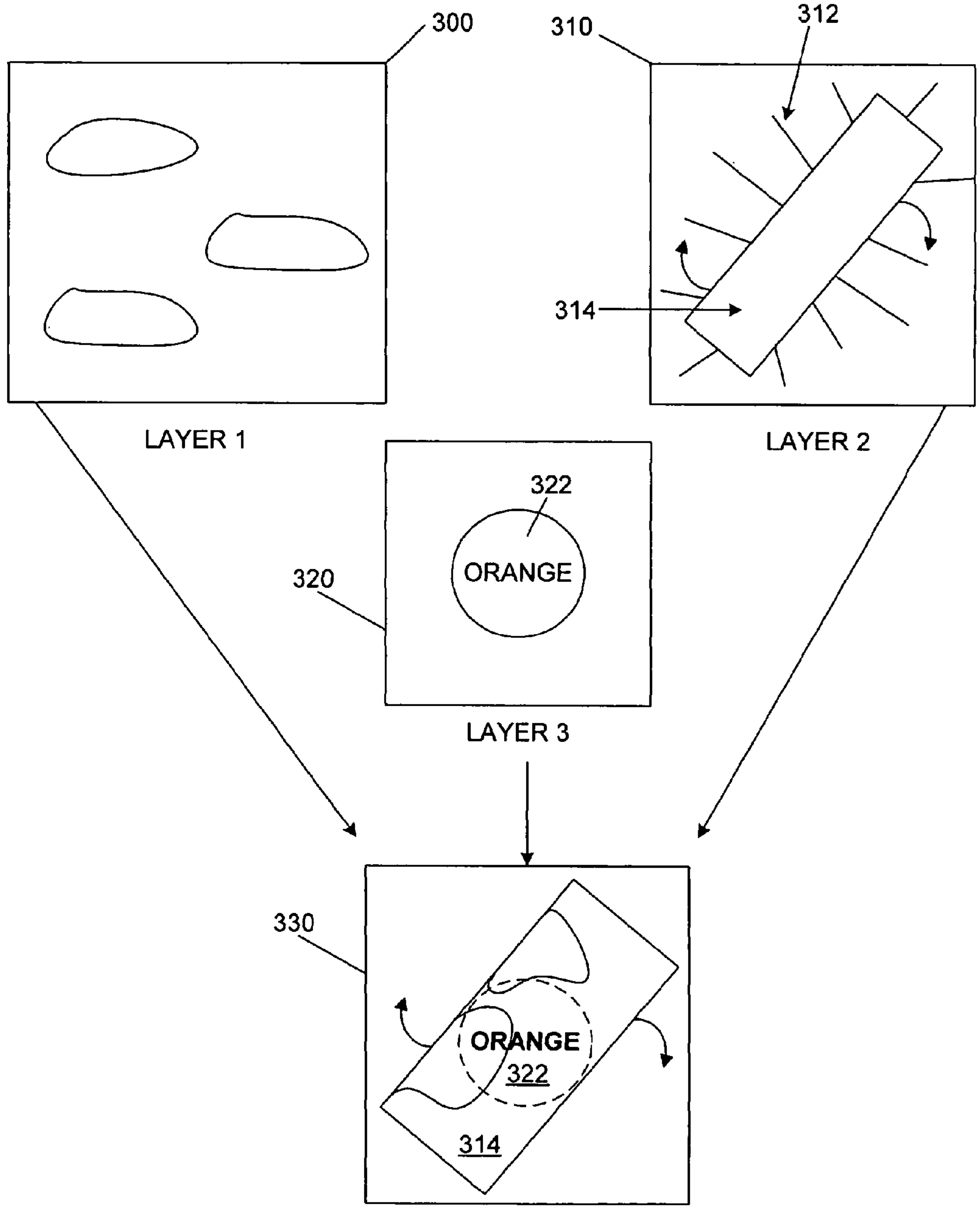
FIG. 3 shows a combination of multiple layers forming a final displayed image.

An example of the operation is shown in FIG. 3. FIG. 3 shows a first layer 300 which is an animation of clouds. The animation is continuous, so that the user sees the effect of traveling through those clouds.

Layer 2 is overlaid on the layer one. Layer 2 is shown as 310, and corresponds to a rectangle which is rotating in a clockwise direction at a specified speed. In this layer, the perimeter area 312 is effectively black and opaque, while the interior area 314 is clear. Accordingly, as this layer is superimposed over the other layer, the area 314 allows the animation of layer 1 to show through, but the area 312 blocks the animation from showing through. The resultant image is shown as 330, with the rotating triangle 314 being transparent and showing portions of the cloud animation 300 through it. A third layer 320 is also shown, which simply includes an orange circle 322 in its center. In the resultant image 330, the orange circle 322 forms an orange filter over the portion of the scene which is showing.

Each layer can have a number of different effects, besides the effects noted above. An incomplete list of effects is:

color shape intensity timing rotation

Parameters associated with any of these effects can be specified. For example, parameters of rotation can be selected including the speed of rotation, the direction of rotation, and the center of rotation. One special effect is obtained by selecting a center of rotation that is actually off axis of the displayed scene. Other effects include scaling Blocking (also called subtractive, allowing defining a hole and seeing through the hole).

Color filtering (changing the color of any layer or any part of any layer).

Decay (which is a trailing effect, in which as an image moves, images produced at previous times are not immediately erased, but rather fade away over time giving a trailing effect).

Timing of decay (effectively the time during which the effect is removed).

A movie can also be produced and operations can include coloring the movie scaling the movie dimming of the image of the movie Shake of the image, in which the image is moved up and down or back-and-forth in a specified shaking motion based on a random number. Since the motion is random, this gives the effect of a noisy shaking operation.

Wobble of the image, which is effectively a sinusoidal motion of the image in a specified direction. For wobble of the image, different parameters can be controlled, including speed of the wobble.

Forced redraw—this is a technique where at specified intervals, a command is given to produce an all-black screen. This forces the processor to redraw the entire image.

Other effects are also possible.

Figure 4:
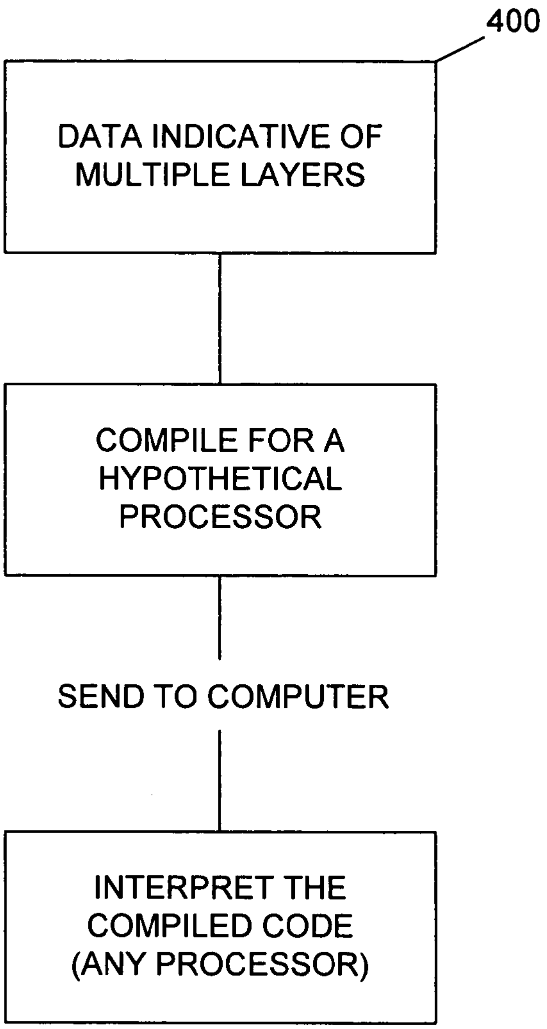
FIG. 4 shows the way that the code can be compiled for a special kind of processor.

The computer may operate according to the flowchart of FIG. 4. The image itself is produced based on information that is received from the console, over the link 120. Each console command is typically made up of a number of layers. At 400, the data indicative of these multiple layers is formed.

Note that this system is extremely complex. This will require the computer to carry out multiple different kinds of highly computation-intensive operations. The operations may include, but are not limited to, playing of an animation, rotating an image, (which may consist of forming the image as a matrix arithmetic version of the image, and rotating the matrix), and other complicated image processes. In addition, however, all processors have different ways of rendering images.

In order to obtain better performance, the code for these systems has been highly individualized to a specified processor. For example, much of this operation was done on Apple processors, and the code was individualized to an Apple G4 processor. This can create difficulties, however, when new generations of processors become available. The developers are then given a choice between creating the code, and buying outdated equipment.

According to this system, the code which forms the layers is compiled for a specified real or hypothetical processor which does all of the operations that are necessary to carry out all of the image processing operations. Each processor, such as the processor 200, effectively runs an interpreter which interprets the compiled code according to a prewritten routine. In an embodiment, a hypothetical processor may be an Apple G4 processor, and all processors are provided with a code decompilation tool which enables operating based on this compiled code. Notably, the processor has access to the open GL drawing environment which enables the processor to produce the image. However, in this way, any processor is capable of executing the code which is produced. This code may be compiled versions of any of the effects noted above.

Although only a few embodiments have been disclosed in detail above, other modifications are possible. All such modifications are intended to be encompassed within the following claims.

What is claimed is:

1. A control system for a console based lighting system, comprising:

a housing, housing at least one computer having a first type of processor, and having a connection which receives commands indicating a precompiled file indicating a plurality of different images and at least one effect for said different images, to be created by an external light;

said connection receiving a control input, and having an output port, producing outputs indicative of a current control of said housing;

said at least one computer receiving said precompiled file which is compiled to include at least a first layer including an image, a second layer that creates a perimeter that blocks all but the perimeter of the first layer, and a third layer that provides color for a combination of the first layer, second layer and third layer, said precompiled file compiled for a processor other than a type of a first processor; and said at least one computer interpreting said precompiled file that includes each of said first, second and third layers, and creating outputs directed to at least one light, that are created from interpreting said precompiled file, wherein each of said first, second and third layers include at least one of a time, a color, and/or an effect, and each layer affects all of other layers, wherein each layer that represents an effect includes a parameter associated therewith specifying an amount of the effect, wherein one of said effects include a continual sinusoidal wobble, and wherein said parameter includes a speed of the continual sinusoidal wobble.

2. The system as in claim 1, wherein there are multiple computers in said housing.

3. The system as in claim 1, wherein said precompiled file is compiled for a hypothetical processor, different than a language of said processor in said housing.

4. The system as in claim 2, wherein said housing having a switch which controls connecting to any of said multiple computers from a single keyboard, and also controls producing outputs from any of said multiple computers to a common monitor.

5. The system as in claim 3, further comprising a code interpreter which interprets said precompiled file into a native language used by said processor in said housing.

6. The system as in claim 1, wherein said first, second and third layers are arranged with one layer overlaying each other layer, each layer affects layers below that layer.

7. The system as in claim 1, wherein said first layer includes an animated image which continuously changes.

8. A control system for a console based lighting system, comprising:

a housing, housing at least one computer having a first type of processor, and having a connection which receives commands indicating a precompiled file indicating a plurality of different images and at least one effect for said different images, to be created by an external light;

said connection receiving a control input, and having an output port, producing outputs indicative of a current control of said housing;

said at least one computer receiving said precompiled file which is compiled to include at least a first layer including an image, a second layer that creates a perimeter that blocks all but the perimeter of the first layer, and a third layer that provides color for a combination of the first layer, second layer and third layer, said precompiled file compiled for a processor other than a type of a first processor; and said at least one computer interpreting said precompiled file that includes each of said first, second and third layers, and creating outputs directed to at least one light, that are created from interpreting said precompiled file, wherein said one of an effect includes a forced redraw, where at a specified interval, an all-black image is created, followed by the processor redrawing an entire image.

9. An effect creating system control system for a lighting system that is remotely controllable, comprising:

a computer which receives information indicating a plurality of different images and at least one effect for said different images, to be created by an external light;

said information including all of a first layer including an image, a second layer that creates a perimeter that blocks all but the perimeter of the first layer, and a third layer that provides color for a combination of the first layer, second layer and third layer, said computer combining said first layer, said second layer and said third layer, and compiling said first layer, second layer and third layer, for a specified kind of processor to create a precompiled file, a specified kind of processor the processor other than one used by external light wherein at least one of said first, second and third layers include an effect, wherein said first layer includes an animated image which continuously changes, wherein one of said effects include a continual sinusoidal wobble, and wherein said parameter includes a speed of the continuous sinusoidal wobble.

10. The system as in claim 9, wherein said precompiled file is compiled for a hypothetical processor.

11. The system as in claim 9, wherein each of said first, second and third layers include at least one of a time, a color, and an effect, and each layer affects all of other layers.

12. The system as in claim 11, wherein said first, second and third layers are arranged with one layer overlaying each other layer, each layer affects layers below that layer.

13. The system as in claim 9, wherein each layer that represents an effect includes a parameter associated therewith, specifying an amount of the effect.

14. The system as in claim 9, wherein one of said effects includes a forced redraw, where at a specified interval, an all-black image is created, followed by the processor redrawing an entire image.

15. A control system for a console based lighting system, comprising:

a housing, housing at least one computer having a first type of processor, and having a connection which receives commands indicating a precompiled file indicating a plurality of different images and at least one effect for said different images, to be created by an external light;

said connection receiving a control input, and having an output port, producing outputs;

said at least one computer receiving said precompiled file which is compiled to include at least a first layer including an image, a second layer that creates a perimeter that blocks all but the perimeter of the first layer, and a third layer that provides color for a combination of the first layer, second layer and third layer, said precompiled file also including at least one effect that causes a shaking of an entire overall image created by combining said first, second and third layers, and said precompiled file being compiled for a processor other than a type of said first processor; and said at least one computer interpreting said precompiled file that includes each of said first, second and third layers, and controlling at least one light, created from interpreting said precompiled file.

16. The system as in claim 15, wherein there are multiple computers in said housing.

17. The system as in claim 15, wherein said precompiled file is compiled for a hypothetical processor, different than a language of said processor in said housing.

18. The system as in claim 16, wherein said housing having a switch which controls connecting to any of said computers from a single keyboard, and also controls producing outputs from any of said computers to a common monitor.

19. The system as in claim 17, further comprising a code interpreter which interprets said precompiled file into a native language used by said processor in said housing.

20. The system as in claim 15, wherein each of said layers include at least one of a time, a color, and/or an effect, and each layer affects all of other layers.

21. The system as in claim 20, wherein each layer that represents an effect includes a parameter associated therewith, specifying an amount of the effect.

22. The system as in claim 15, wherein said first layer includes an animated image which continuously changes.

23. The system as in claim 21, wherein one of said effects include a continual sinusoidal wobble, and wherein said parameter includes a speed of the wobble.

24. The system as in claim 15, wherein one of said effects includes a forced redraw, where at a specified interval, an all-black image is created, followed by the processor redrawing the entire image.

* * * * *